United States Patent [19]
Holloway

[11] Patent Number: 5,226,079
[45] Date of Patent: Jul. 6, 1993

[54] NON-REPUDIATION IN COMPUTER NETWORKS

[75] Inventor: Christopher J. G. Holloway, Woking, United Kingdom

[73] Assignee: International Business Machines Corporation, Armonk, N.Y.

[21] Appl. No.: 777,848

[22] Filed: Oct. 16, 1991

[30] Foreign Application Priority Data

Nov. 9, 1990 [GB] United Kingdom ............... 9031230

[51] Int. Cl.⁵ .............................................. H04L 9/00
[52] U.S. Cl. ........................................ 380/25; 380/49
[58] Field of Search ............................ 380/25, 49, 9

[56] References Cited

U.S. PATENT DOCUMENTS

| | | | |
|---|---|---|---|
| 4,264,782 | 4/1981 | Konheim | 380/25 |
| 4,326,098 | 4/1982 | Bouricius et al. | 380/25 |
| 4,393,269 | 7/1983 | KonHeim et al. | 380/25 |
| 4,918,728 | 4/1990 | Matyas et al. | 380/25 |
| 4,926,478 | 5/1990 | Gruenberg | 380/25 |

FOREIGN PATENT DOCUMENTS 0246823 11/1987 European Pat. Off. .

OTHER PUBLICATIONS

IBM TDB, vol. 26, No. 1, Jun. 1983, pp. 199–201, USA by W. D. Hopkins "Transaction Incrementing Message Authentications".

IBM TDB, vol. 25, No. 1, Jun. 1982, p. 279, USA, by J. Suigals "Dynamic Communication Key Accumulated From Previous Message Content".

Primary Examiner—Salvatore Cangialosi
Attorney, Agent, or Firm—Joseph C. Redmond, Jr.; Lauren C. Bruzzone

[57] ABSTRACT

The invention supplements the use of a conventional authentication token such as a MAC or DSG, to provide very strong evidence of the origin of an electronic message. A new type of authentication token, known as the "Non-Repudiation Vector" (NRV) is attached to each message sent across a data network. The NRV cryptographically links each message sent or received by a particular data processor on the network to previous and subsequent messages handled by that data processor, to create a chain of cryptographically linked messages. The burden of proof for the repudiation of a message is transferred to the sender of a message, who must demonstrate how the sending data processor could have moved through the time period during which the disputed message was sent, without generating the NRV corresponding to the disputed message.

18 Claims, 11 Drawing Sheets

FIG. 8

NRL LOG ENTRIES (800)

| | LCV (810) | | LGL NRT (820) | NRT (830) | | LINK PTRS (840) | |
|---|---|---|---|---|---|---|---|
| | LSQ | OSQ | | G- | L- | GEN | TRN |
| 861 | 861 | 861 | L1 | G1 | 00 | 000 | 000 |
| 862 | 862 | a | L2 | R2 | 00 | 861 | 000 |
| 863 | 863 | 863 | L3 | G3 | G1 | 861 | 861 |
| 864 | 864 | f | L4 | R4 | R2 | 863 | 862 |
| 865 | 865 | R | L5 | R5 | G3 | 863 | 863 |
| 866 | 866 | 866 | L6 | G6 | R5 | 863 | 865 |
| 867 | 867 | 867 | L7 | G7 | R4 | 866 | 864 |
| 868 | 868 | m | L8 | R8 | G7 | 867 | 867 |

831, 832, 842, 841

MESSGE NRVs (880)

| OSQ (881) | NRT (882) | | TRN-CTL (883) |
|---|---|---|---|
| | G- | L- | |
| 861 | G1 | 00 | F |
| a | R2 | 00 | F |
| 863 | G3 | G1 | M |
| f | R4 | R2 | M |
| R | R5 | G3 | M |
| 866 | G6 | R5 | L |
| 867 | G7 | R4 | M |
| m | R8 | G7 | L |

NON-REPUDIATION IN COMPUTER NETWORKS

BACKGROUND OF THE INVENTION

1. Technical Field

The present invention relates to computer networks, and in particular to apparatus and methods for resolving the problem of non-repudiation of messages transmitted using such networks.

2. Background Information

Confidential or secret data are often transmitted across electronic networks linking separate data processing machines. For example, data relating to banking transactions are often transmitted between bank branches electronically via networks comprising electrical, optical, radio or other communication links, rather than on paper. The need for these networks to provide secure transmission of the data has long been recognized. To this end, sensitive data are commonly enciphered before being transmitted.

The encipherment of data for transmission is described in detail in the book "Security for Computer Networks" (D. W. Davies and W. L. Price, 1984, John Wiley & Sons). There are several methods or algorithms by which data can be enciphered, usually under the control of an encipherment key. However, for the present purposes these algorithms will be considered as two categories, namely symmetric and asymmetric algorithms.

Symmetric algorithms rely on a secret key which is known only to the sender and receiver of a message. The same key is known by both parties, and the system provides a secure bidirectional communications channel between the two parties. An example of a symmetric algorithm is the Data Encryption Standard (DES), which is described in the above reference.

In an asymmetric algorithm (also described in the above reference) the sender and receiver of the message hold different, but complementary, keys. The keys are complementary in that one key can only be used for encipherment, and the other key only for decipherment. Only one of these keys needs to be kept secret, and in fact a major feature of such an algorithm is that the other, non-secret, key can be disclosed widely without compromising security at all. In such a public key system, the data receiver typically holds a secret key, to be used for deciphering received messages. The corresponding encipherment key is made public and is used by any party wishing to send messages to that particular receiver.

A security concern is that it must be possible to establish the authenticity of a message transmitted between two parties. In other words, the recipient should be able to establish that an individual message, purportedly received from a particular sender, was in fact initiated by that sender and has been received without corruption either by network errors or malicious alteration by other parties. This is particularly necessary when there is little redundancy in the message before encipherment; for example a message comprising a long string of digits could appear to be a random sequence under casual inspection. In these cases it would be difficult to tell from the text of the deciphered message alone whether corruption had taken place.

It will also be clear that if the text is enciphered using a public key system, then some means is required to authenticate the identity of the sender.

Authentication of a message is often performed by the sender attaching an authentication 'token' to the message. In the case of DES encipherment, this token may be referred to as the "Message Authentication Code" or MAC. The sender generates an authentication token from the text of the message using a secret key known only to the sender and receiver. The sender then transmits the token, along with the message, to the receiver. When the message has been succesfully received, the receiver generates his own version of the token, from the text of the message, using the secret key, and compares it with the received token. If the two versions of the token are identical, the authenticity of the message has been established.

The use of authentication tokens provides assurance, to the receiver, of the authenticity of the sender's identity and the message content in all cases except that of a dispute between the sender and receiver themselves. For reasons described more fully below, it is possible for the sender to repudiate, or deny the initiation of, a message received by the receiver, on the grounds that the receiver could have enciphered the message and generated the corresponding token himself. In other words, because it is within the ability of the receiver to forge a message and corresponding token, the receiver cannot prove that a received message and token originated at the sender. This problem illustrates the need for a non-repudiation technique which can provide further evidence of the origin of a message. Such a technique would increase confidence in the use of electronic networks such as automated electronic value transfer systems.

In particular, symmetric authentication algorithms have the obvious weakness that the same key is known to both sender and receiver, and in fact the authentication token is generated by the receiver during the authentication process.

In the case of asymmetric authentication algorithms, where the authentication token is usually referred to as the "digital signature" (DSG), it has been argued that because the sender and receiver hold different, complementary, keys, the receiver is able to verify but not to generate the sender's authentication token. The argument continues that if the token is valid, then the sender must have been responsible for the message. However, in order to maintain this argument as support for a claim of non-repudiation it must be shown that the key value used by the sender to generate the authentication token is held uniquely by the sender.

Asymmetric properties can also be achieved in symmetric encryption systems through the use of hardware controls which prevent a receiver from using his key to emulate the legitimate actions of the sender. The IBM 4753, 4754, and 4755 products have just such a property. (IBM is a registered trademark of the International Business Machines Corporation).

Several other approaches have been made to increase confidence in the authenticity of a message. U.S. Pat. No. 4,264,782 and U.S. Pat. No. 4,326,098, assigned to the assignee of the present invention, describe a security verification unit referred to as a "vault," the purpose of which is to act as a secure repository of the encryption keys corresponding to a number of associated data terminals. These keys are used to establish the authenticity of communications between terminals.

U.S. Pat. No. 4,393,269, assigned to the assignee of the present invention, relates to protocols whereby the recipient of a message is able locally to establish, with differing levels of confidence, the integrity of a received message.

All of the systems described above base the integrity of the sender's identity and the message content on the assumed fact that the sender's key is unique. In both the symmetric and the asymmetric approaches, the secret keys are protected through the use of hardware designed to be resistant to tampering, or physical or electronic attack. The property of key uniqueness is thus predicated upon the trustworthiness of the hardware itself and the security procedures used to manage the hardware. The assumed uniqueness of the sender's key may therefore be compromised for one of several reasons:

a) By pure chance; this is unlikely but impossible to disprove;

b) By legitimate intent; to facilitate backup or capacity requirements, several identical hardware units may need to exist;

c) By illegitimate intent; where legitimate intent is made possible within an organization by working practices within that organization, then such practices may be subverted by blackmail or threat;

d) By accident; it is imperative that key management authorities do not assign the same keys and identities to two or more data processing units, and do not initialize a unit whose hardware is not shown to be secure. However, either objective may be accidentally breached.

Irrespective of the cause of key duplication, there is always the possibility of its occurrence.

Further attacks on the non-repudiation claim may be made. For example, if a hashing algorithm linking parts of the message together (which does not require secret keys) is found to be weak, then alternative data messages may be successfully attached to genuine authentication tokens. Such an attack on a commonly used hashing function (the ISO Standard Hash 2 function) has been identified. This makes it difficult to show that the data belonged to its associated authentication token when the message was initiated.

The prior art does not provide, therefore, a strong technique for supporting a claim of non-repudiation of a message.

SUMMARY OF THE INVENTION

The invention provides the means to link each message transmitted or received by a particular hardware unit, to previous and subsequent messages handled by that unit. A chain of cryptographically linked messages is therefore created.

Viewed from a first aspect the present invention provides a data processor, connectable to a network of other data processors, comprising: means, when connected to the network, for sending a message to a second data processor forming part of the network; and characterized by: means for cryptographically combining information derived from the message, information derived from one or more previous messages transferred between the first data processor and the second or another data processor forming part of the network, and secret information held by the first mentioned data processor, to produce a token to be associated with the message.

The invention supplements the use of an authentication token attached to a message, to provide very strong evidence of the origin of the message. Even though several hardware units may share the same key values and even logical identities, the invention makes it possible to differentiate which of these units was responsible for the generation of a new type of token to be referred to as the "Non-Repudiation Vector" (NRV).

In a data network according to the invention, the burden of proof of repudiation of a message is transferred to the sender of the message. In order to repudiate a message, the sender must demonstrate how his hardware unit could have moved through the time period during which the disputed message was sent, without generating the NRV corresponding to the disputed message. The disputed NRV may be seen as a "bridge" between the previous and subsequent activity of the sender's hardware unit, and so to repudiate the disputed NRV is also to repudiate all previous and subsequent transactions of the sender (which by the time of the dispute may have been accepted as legitimate). These previous and subsequent transactions may have been carried out with a large number of other, independent, hardware units, perhaps belonging to different commercial organizations. In the case of a dispute over a particular message, therefore, these other organizations can provide independent corroboration of the integrity of the message. Where necessary, subsequent corroborated activity may be established, following a dispute, by exchange of messages with an independent adjudicating authority. Similarly, previous corroborated activity may also be established by exchanging messages with such an authority before the sender's hardware unit is first employed for business transactions.

In other words, to repudiate a claimed message, the sender's hardware unit must re-process that message at the point in the unit's history at which the claimed message was purportedly sent, and demonstrate that the NRV generated during the reprocessing of the claimed message does not correspond to the NRV attached to the claimed message, and also does not link to the subsequent activity of the sender's hardware unit.

Additionally, the sender must be able to demonstrate the proper linkage between previous and subsequent activity at the sender's hardware unit, if necessary by producing an alternative message which enables the linkage to be made. Such a message should also be capable of corroboration by the correspondent to that message.

At each sender's hardware unit a log of the activity of the hardware unit should preferably be maintained. The log provides a store for storing secret information derived from the token or the associated message or both, and also non-secret information derived from the message or its associated token or both. This log, known as the Non-Repudiation Log (NRL) should be maintained with integrity, so that no illegitimate additions, deletions or modifications may be made without detection. Additionally, some of the information on the log, which links the activities at the log into a sequence represented by the NRVs should be kept secret. The means of logging, and of maintaining integrity and secrecy of the logged data (whether physical or cryptographic means), may be those known in the prior art. In order to provide the linkage mechanism, cryptographic means are employed.

The linkages between previous and subsequent activity, and values of the NRVs themselves, are determined using keys stored within the sender's hardware unit. There is no necessity to share these keys with any other unit; however, even if they are shared the property of non-repudiation is not compromised, since other units will not have experienced the same history of message processing, and so as state machines will be unique.

Preferably the receiver of a message is sent a copy of the NRV generated by the sender, and stores information derived from the received NRV for use in resolving a dispute. For simplicity, the NRV may be appended to its corresponding message. However, it would be sufficient in the broadest aspect of the invention merely to associate the message and its corresponding NRV in some way. In this case the NRV might be stored by the sender's hardware or at some other location. In a preferred embodiment the NRV is appended to the message and cryptographically associated with the message by an authentication token such as a MAC or DSG, before being sent; the sender and receiver of the message both then store information derived from the NRV as an entry in an ordered list stored in a dedicated store (the Non-Repudiation Log). Further, locally generated, security information may also be stored at the sender and/or the receiver in connection with a particular message.

It is preferred that some or all of the information derived from the one or more previous messages is in fact obtained from the tokens associated with that message or messages.

Although the invention is applicable to a data processor used only as a sender or only as a receiver of messages, it is preferred that a data processor according to the invention includes message sending and receiving means, so that a single unit can be used both to send and to receive messages. This is preferable because in a typical business application of such a data processor the messages would form part of a two-way correspondence between data processors.

If a dispute over message repudiation arises, the NRV or information derived from the NRV will be required in order to resolve the dispute. It is therefore preferred that each entry in the dedicated store referred to above is linked to the entry corresponding to the previous message handled by the combining means. This linkage could be achieved using addressing pointers, or more simply by storing the entries consecutively, in chronological order. In practice each message will form a part of a transaction between two or more data processors. A particular data processor may be involved in several such transactions concurrently. Therefore, to make it easier to trace the entries corresponding to a particular transaction, it is preferred that these entries are also linked, for example using relative addressing pointers.

A further link between each entry in the dedicated store and the entry corresponding to the last message sent by the data processor is also preferred.

In a preferred embodiment, the NRV contains control information, and information derived from the current message, the previous message in the current transaction, the last message sent by the data processor, and the last message recorded in the sender's dedicated store. The information derived from messages other than the first can of course be obtained with reference to the NRV or other stored information corresponding to those messages. As mentioned above, it is preferable to use a cryptographic authentication token (a MAC, DSG or other token as known in the art) to associate the current message with its NRV. This token may be sent to the message receiver as part of the NRV. In a preferred embodiment the receiver includes means for verifying the integrity of the authentication token.

Viewed from a second aspect the invention also provides a data network comprising a plurality of data processors as described above, and means connecting the data processors for the transfer of messages therebetween.

BRIEF DESCRIPTION OF THE DRAWINGS

In order that the invention may be fully understood a preferred embodiment thereof will now be described, by way of example only, with reference to the accompanying drawings in which:

FIG. 8 is a table which shows the relationship between the contents of the NRVs associated with messages and the corresponding NRL entries of two unrelated and interleaved transactions;

DESCRIPTION OF THE PREFERRED EMBODIMENT(S)

Figure 1:
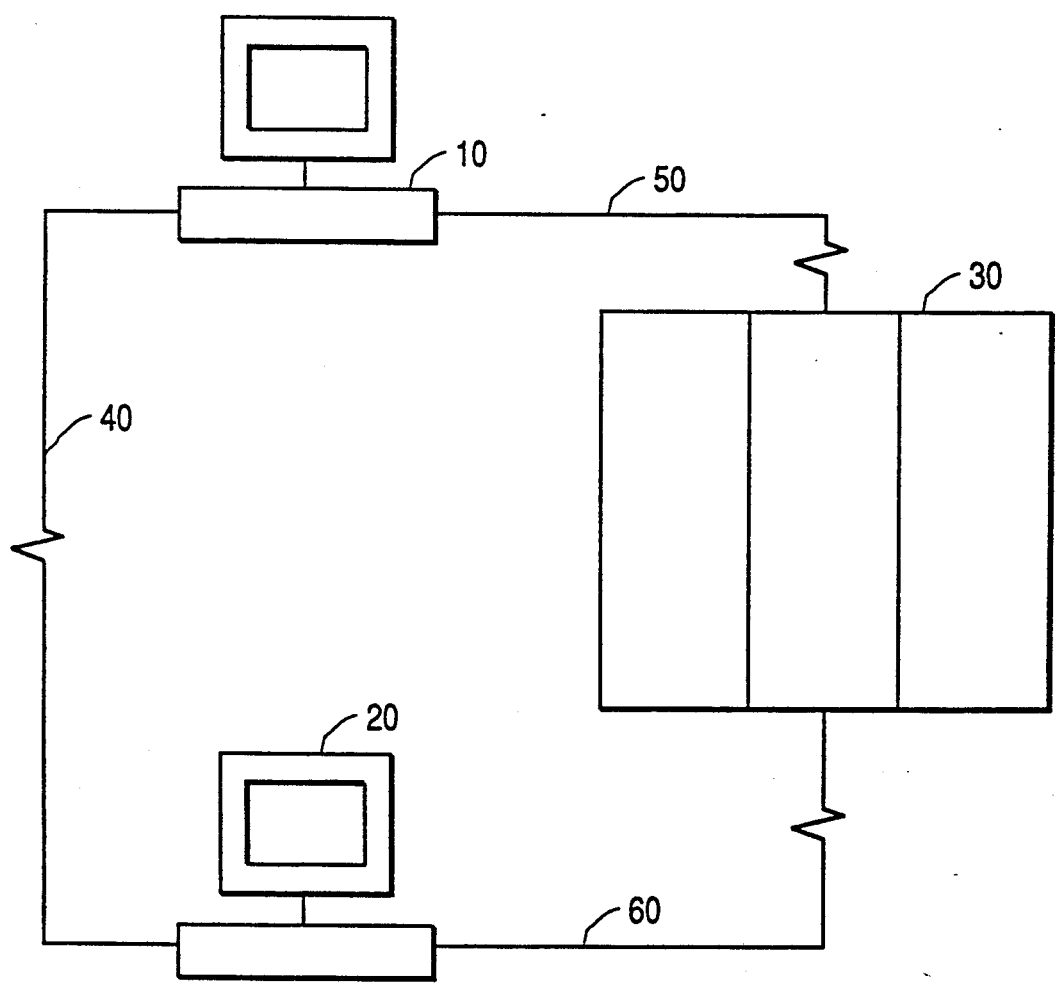
FIG. 1 is a schematic representation of a data communication network as known in the prior art.

Refer now to FIG. 1 which shows a schematic data network linking three data processing machines 10, 20 and 30 such as micro computers, mainframe computers, point of sale terminals or automatic teller machines. Data processors 10, 20 and 30 may be in separate buildings, cities, or even countries. The data links 40, 50 and 60 used in the network may include electrical, radio, optical fiber or other transmission media, or portable storage media. Except in the case of networks within individual buildings, it is typical for the links to be operated by a telecommunications company and leased or hired to the link user. When sensitive commercial or financial information is exchanged between the data processors, encipherment is commonly used to maintain the confidentiality of the information.

Figure 2:
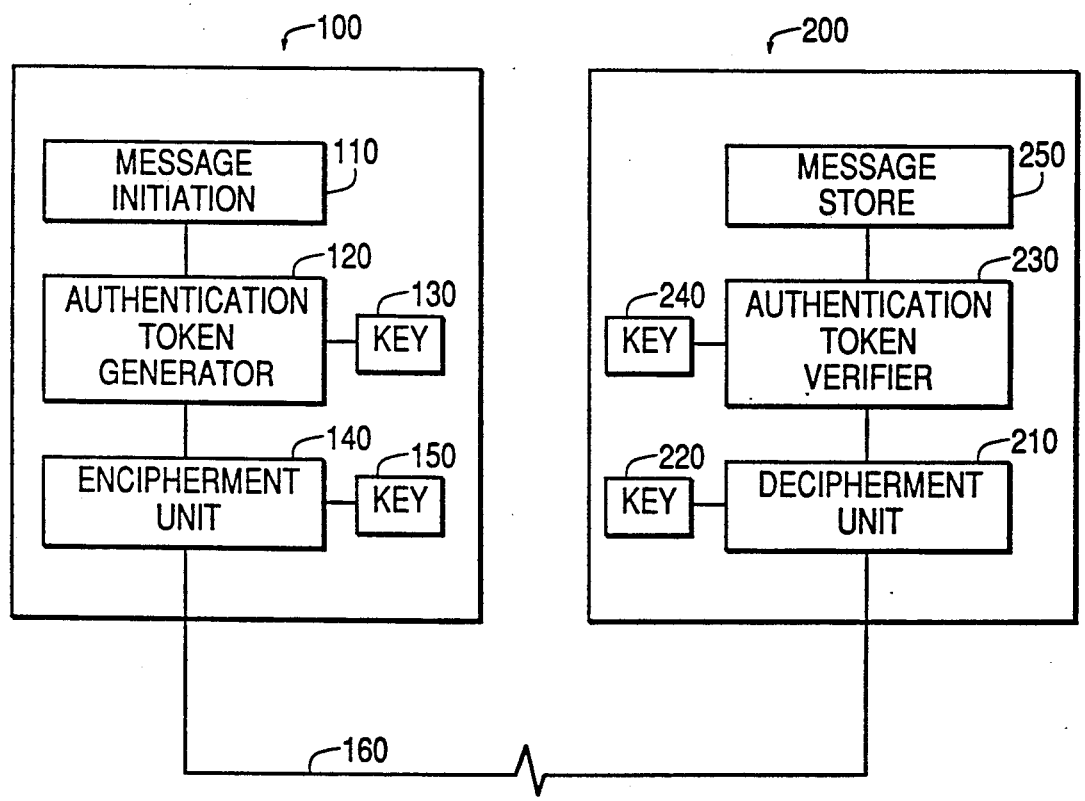
FIG. 2 is a block diagram which shows the operation of two data processors exchanging information across a network, as known in the prior art.

FIG. 2 shows the operation of two data processors 100 and 200 arranged to exchange enciphered data via data link 160. In data processor 100 a message is initiated by unit 110 which may be a storage device or another part of the data processor. Unit 120 enciphers the message under control of key 130, and unit 140 generates an authentication token associated with the message, under the control of key 150. The enciphered message and the authentication token are then transmitted to data processor 200 via link 160.

When the enciphered message and the token are received by data processor 200, the message is deciphered by unit 210, under the control of key 220. Unit 230 then verifies the integrity of the authentication token under the control of key 240. Finally the message is stored in unit 250 for further processing as may be required by data processor 200.

It will be clear that all of the apparatus described in connection with FIG. 2 is well-known in the art of data transmission. Symmetric or asymmetric encipherment and authentication algorithms may be used. If symmetric algorithms are used, key 130 will be identical to key 240, and key 150 will be identical to key 220. If asymmetric algorithms are used, these keys will pairwise correspond but will not be identical in value.

Figure 3:
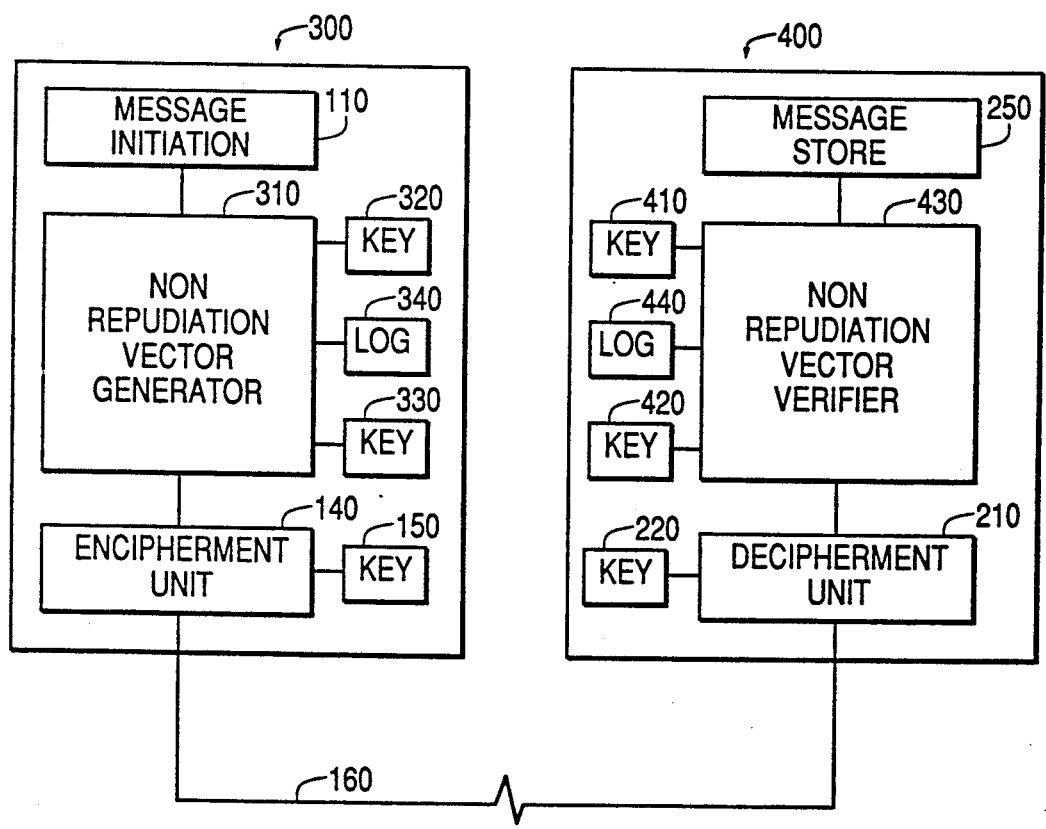
FIG. 3 is a block diagram which shows two data processors exchanging information according to the invention.

FIG. 3 shows a system according to the invention for the exchange of messages between data processors 300 and 400, via link 160. In the figure, data processor 300 is the sender and data processor 400 the receiver. However, it will be understood that in practice it is common for a single data processor selectively to act as sender and receiver.

Data processor 300 contains a message initiation unit 110, and an encipherment unit 140 under the control of encipherment key 150, as described above in connection with FIG. 2. Data processor 400 contains a corresponding message store unit 250 and a decipherment unit 210 under the control of key 220.

After the message has been initiated by data processor 300 using unit 110, it is passed to unit 310, the non-repudiation vector (NRV) generator. The NRV itself will be described in more detail below. This unit 310 is under the control of two further keys 320 and 330, and receives, as an input, information stored in the non-repudiation log 340 (NRL) derived from one or more previous messages transmitted or received by data processor 300 and presented to unit 310 (not all messages sent or received by the data processor need be presented to unit 310—it is possible that only those messages exchanged with other data processors operating a non-repudiation mechanism may be passed to unit 310). The information stored in the non-repudiation log is stored with integrity, and some parts of the information are stored with secrecy. The mechanism for ensuring the appropriate integrity and secrecy for the information is not shown here, but could include physical or cryptographic means as used in the prior art. Unit 310 generates the NRV from the current message and the previous information, under the control of key 320, and also generates a corresponding NRL entry, again under the control of key 320. This NRL entry is stored on the NRL 340. The NRV generator 310 also generates an authentication token (MAC or DSG), as described, for example, in the text "Security for Computer Networks" by D. W. Davies and W. L. Price, Supra at pages 132, 133, using key 330, cryptographically binding the transmitted NRV to the transmitted message. This token can be verified in the usual way by receiver 400, using the NRV Verifier unit 430 under control of key 420.

The compound message, including the NRV, is passed to unit 140 where it is enciphered using key 150. The enciphered compound message is transmitted via link 160 to data processor 400. As far as the link is concerned, the NRV is indistinguishable from the rest of the data to be transmitted.

When the message is received by data processor 400 it is passed to the decipherment unit 210 where it is deciphered using key 220. The authentication token is checked for authenticity by the NRV verification unit 430, under the control of verification key 420. After this verification, unit 430 strips the NRV from the message and using key 410 generates an NRL entry from the message, the NRV, and one or more previous entries from the NRL. Unit 430 then places the generated NRL entry on the NRL and passes the message to data processor 400 for storing in message store 250. The same NRL may be used to store entries corresponding to messages transmitted and received by a data processor.

Once again, symmetric or asymmetric algorithms may be used. If symmetric algorithms are used, key 330 will be identical to key 420 and key 150 will be identical to key 220. If asymmetric algorithms are used these keys will pairwise correspond but will not be identical in value. In both cases keys 320 and 410 are unrelated to one another.

In practice many data processors may be intercommunicating, there may be different values of keys 150, 220, 330 and 420 used selectively as appropriate to the parties to each transmission. However, keys 320 and 410 are specific to the owning data processor, and as such may be invariant and need not relate to the parties involved in each transmission.

Figure 4:
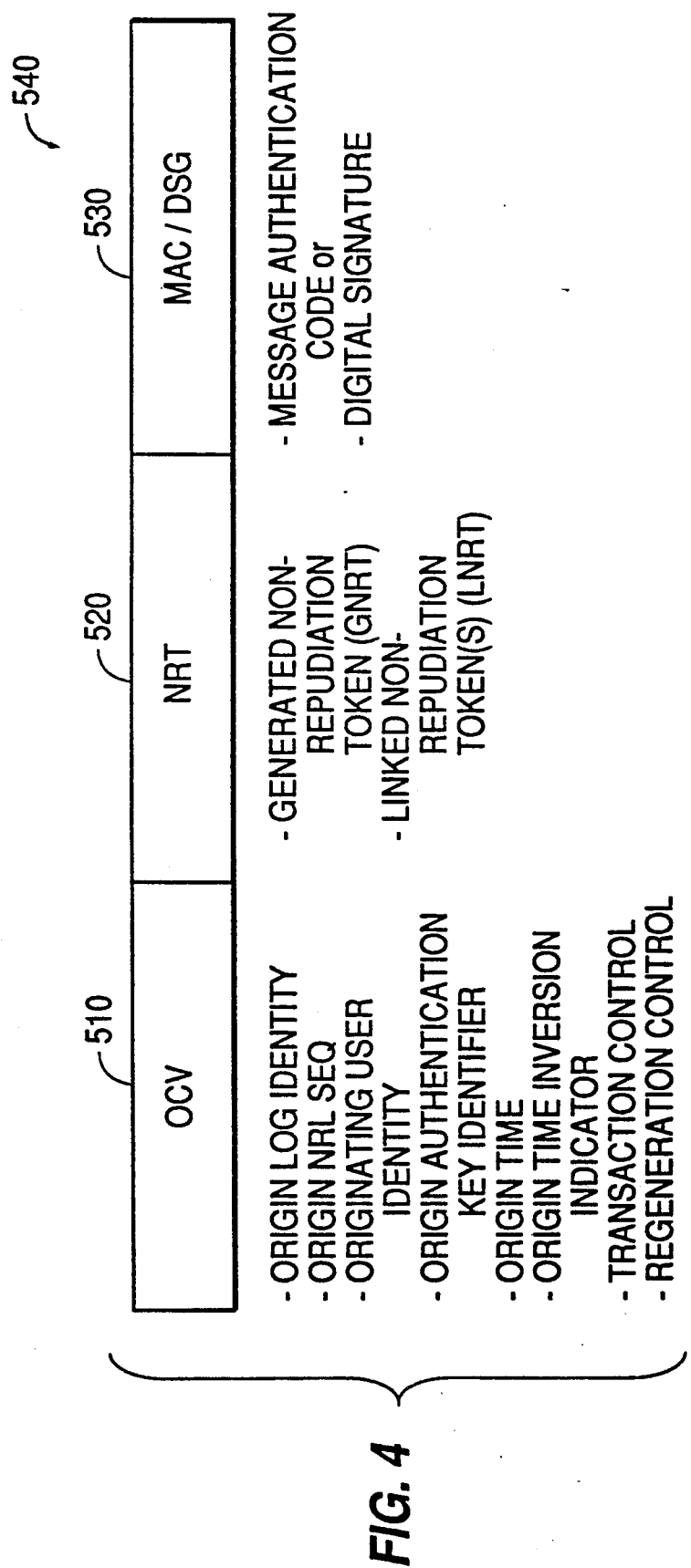
FIG. 4 is a block diagram of a Non-Repudiation Vector (NRV) used in a preferred embodiment of the invention.

FIG. 4 illustrates the information contained in the non-repudiation vector (NRV) associated with each message. The NRV 540 is a data structure which is associated with all participating messages. It contains information which identifies the originator of the message, a token 520 binding a message to previous and subsequent messages which may or may not relate to the same transaction or the same correspondent data processor, and an authenticator 530 which cryptographically binds the NRV to its associated message.

In a preferred embodiment the NRV 500 contains the following components:

The Origin Control Vector (OCV) 510

The origin control vector contains the identification of the originators of the message and of the NRV associated with the message, the identity of the sender's NRL, and synchronization data. The following sub-features are included in the OCV:

a) Origin Log Identity—This is the identity of the non-repudiation vector generation unit 310 used to generate this NRV.

b) Origin NRL Sequence—This is the identity of the entry on the originator's NRL 340 corresponding to this NRV.

c) Origin User Identity—This identifies the user of the data processor 300 responsible for presenting the original message to the NRV generator 310.

d) Origin Authentication Key Identifier—This identifies the key 330 used for generating the authentication token binding the message to the NRV.

e) Origin Time—This is the time of day and the date as known to the originating NRV generator 310.

f) Origin Time Inversion Indicator—This indicates whether or not the entry on the originator's NRL corresponding to the message in the present transaction most recently received at the originator had a claimed origin time later than the origin time of this NRV.

g) Transaction Control—This states whether this NRV had been generated for a message that supports to be the first, middle or last message of a linked transaction.

h) Regeneration Control—When testing a claimed repudiation (described later) it becomes necessary to request that the non-repudiation tokens of a message or messages are regenerated, given the information which would have been available at the time of original generation. This activity also creates additional entries in the NRL. In order to distinguish messages associated with regenerated NRVs from authentic messages this flag declares whether the NRV is original or regenerated.

The Non-Repudiation Token (NRT) 520

The NRT contains the information which may be externally audited and tested to demonstrate whether the claimed NRV generator 310 was instrumental in generating the NRV. It may be a compound data structure containing the following sub-features:

a) The Generated Non-Repudiation Token (GNRT)—This is the published value generated by the NRV generator 310 associated with the originator's data processor 300. In the present embodiment the GNRT comprises eight bytes of binary data.

b) The Linked Non-Repudiation Token (LNRT)—This is potentially a free format token of variable length, the purpose of which is to provide an externally auditable association of this NRV with one or more other NRVs previously exchanged between the same two data processors 300 & 400. In the preferred embodiment it is a single data item comprising eight bytes of binary data, and corresponds to the GNRT from the NRV associated with the previous message sent or received in the same transaction. In practice this linkage can be of considerable value, but convention may require further or fewer linkages to be established.

The Message Authenticator 530

This is a MAC or DSG which cryptographically associates the message with the attached NRV. It covers both the message and all of the components of the NRV described above.

To summarize, in the present embodiment each NRV is linked, by means of its non-repudiation token (NRT), to three things:

a) The message with which the NRV is associated;
b) The previous message in the current transaction; and
c) The sequence of entries stored in the log.

Figure 5A:
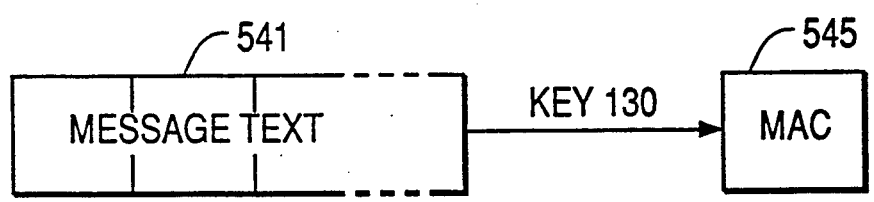
FIG. 5a is a schematic of a message which has been cryptographically sealed according to the prior art.
Figure 5B:
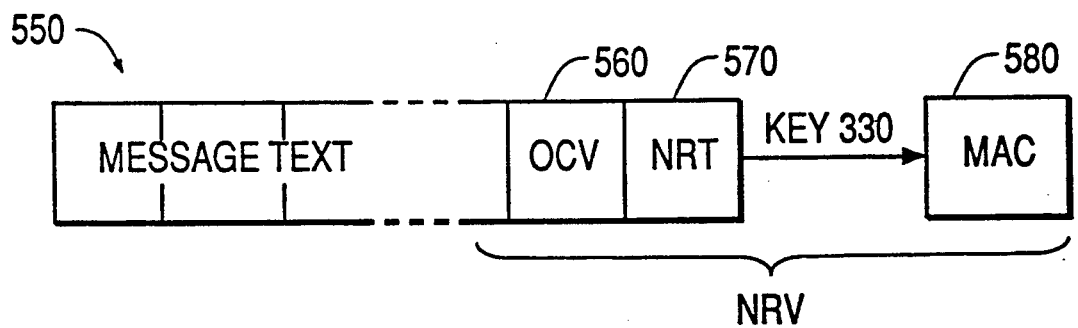
FIG. 5b is a schematic of a message cryptographically sealed according to the present invention.

FIG. 5 illustrates the cryptographic association of the message with the NRV through the agent of an authentication token. It is known in the prior art (FIG. 5a) to cryptographically "seal" a message 541, to allow any illicit modifications to be detected, by calculating an authentication token 545 (a MAC or DSG, as described above) from the message data and a secret key 130. The same procedure may be used in the present embodiment (FIG. 5b) to bind the message 550 with components of the NRV 510, 520 by calculating the authentication token 580 from the combined data and a secret key 330. In this way any attempt to modify the message or the contents of the NRV will be detected when the authentication token is verified.

Figure 6:
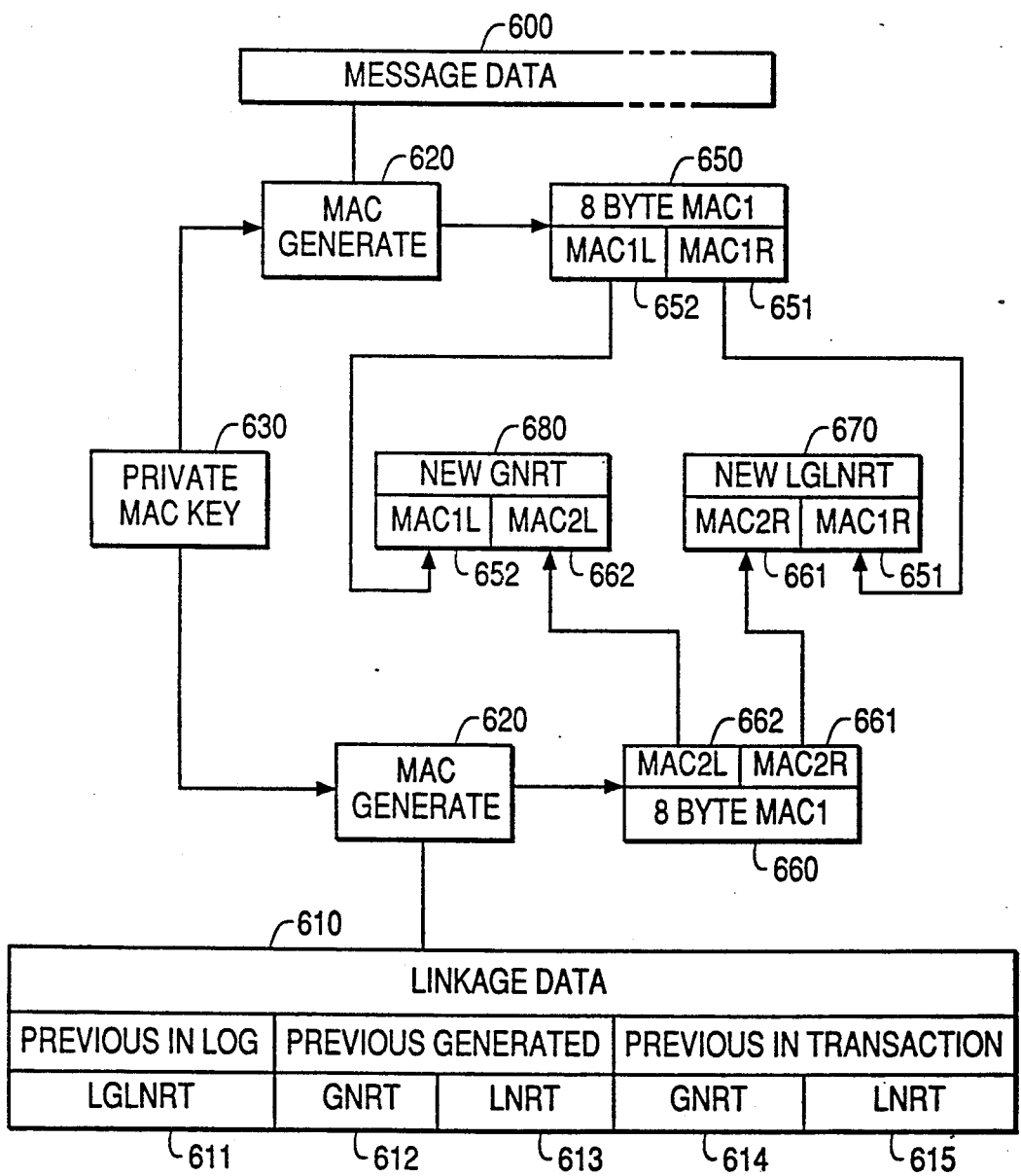
FIG. 6 is an algorithm used to generate parts of the NRV.

FIG. 6 illustrates the procedure for generating non-repudiation tokens for inclusion within the NRV and for confidential storage on the NRL. With reference to the figure, the inputs to the procedure are:

a) The message data 600 with which the NRV is to be associated; and
b) The linkage data 610 to which this NRV is to be cryptographically bound.

The non-repudiation token (NRT) generation procedure is under the control of a private encryption key 630 (which need not be unique to this NRV generating unit) and employs the message authentication code (MAC) generating procedure known in the prior art. The procedure produces two non-repudiation tokens, to be referred to as the generated non-repudiation token (GNRT) 680 and the log-linkage non-repudiation token (LGLNRT) 670. The GNRT is incorporated in the NRV associated with the message, but the LGLNRT is maintained secret and is stored on the non-repudiation log NRL.

The GNRT and the LGLNRT each comprise two sections, a left and a right section. In each case these sections are obtained from sections of two MACs generated respectively from the message and the linkage data. In this way the GNRT and LGLNRT are each dependent upon both the message and the linkage data.

The generating procedure comprises two main steps, which are carried out simultaneously. The first stage is for a MAC generator 920 to generate a first MAC, MAC1 (650), from the message using the private key 630. MAC1 650 is eight bytes long and is subdivided into two parts, namely MAC1L (652), the leftmost four bytes, and MAC1R (651), the rightmost four bytes. MAC1 650 provides a cryptographic link between the message and the NRV.

A second MAC, MAC2 (660), is generated by generator 620 according to the key 630. This MAC 660 is generated from a composite word 610 comprising LGLNRT 611, the GNRT 612 and LNRT 613 from the previous NRV generated at this NRV generator unit and stored on this NRL, and GNRT 614 and LNRT 615 from the previous message sent or received in the present transaction, concatenated in that order. Again, MAC2 (660) consists of two four-byte parts, namely MAC2L 662, the leftmost four bytes, and MAC2R 661, the rightmost four bytes. MAC2's purpose is to provide a cryptographic link between the present message, the previous message in the transaction, and the previous message originated by the sender.

The new GNRT 680 is then generated by concatenating MAC1L (652) and MAC2L (662), to form an eight-byte field. Similarly, the new LGLNRT 670 is the concatenation of MAC2R (661) and MAC1R (651).

As the MAC procedure operates on a variable length input, the message and the linkage data may be of variable length. In particular this allows flexibility in defining by convention how many linkages and of what type are required in the linkage data for any practical implementation. For the non-repudiation mechanism to be valid at least one secret linkage token (in this case, the LGLNRT 611 of the previous entry on the originator's NRL) must be present. In the present embodiment further linkage information (612, 613, 614, 615) is used; other linkage mechanisms could be employed, but in each mechanism appropriate data and pointers will need to be provided in the NRL to enable the linkage information to be accessed.

The preferred embodiment is not intended to limit the generating procedure beyond the requirement identified above for a secret linkage token such as token 611. In particular the private MAC key 630 could be replaced by a multiplicity of keys used to generate a corresponding multiplicity of authentication tokens (MACs, DSGs, or other tokens), from which data is drawn in some manner to create the non-repudiation tokens.

From the above derivation it will be seen that LGLNRT is dependent on the current message and on the LGLNRT from the previous entry in the NRL. By construction it is therefore dependent upon all previous messages handled by this NRL.

Figure 7A:
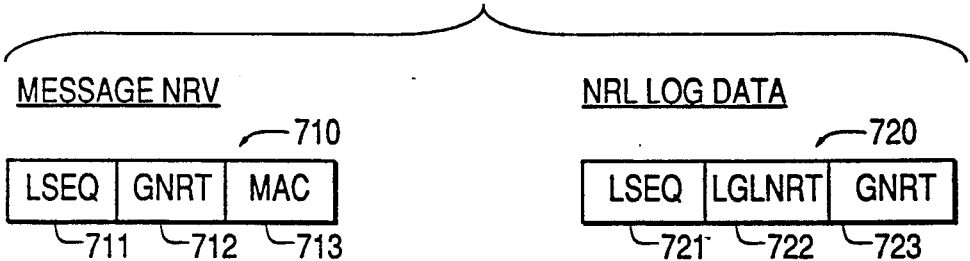
FIGS. 7a–7e are schematics which show the relationship between the contents of the NRVs associated with messages and the contents of the NRL entries corresponding to the NRVs for different levels of linkage achievable with the invention.

FIG. 7a shows a basic implementation of the NRV and corresponding NRL entry; FIGS. 7b-7e then show enhancements to this basic form. In the preferred embodiment the final stage of enhancement shown in FIG. 7e is used.

Referring to FIG. 7a, the NRV 710 associated with a particular message is shown, along with the NRL entry 720 corresponding to that message. In this basic implementation three parts of the NRV are shown: the logged sequence number, LSEQ 711, the GNRT 712 discussed above, and an authentication MAC binding the other components 711 and 712 of the NRV to the message. LSEQ 711 is a component part of the OCV described above, and is made equal to the sequence number 721 of the NRL entry 720 corresponding to the message. This means that the NRL can be located at a later time for verification purposes. The generated non-repudiation token GNRT is recorded both in the NRV as 712 and in the NRL as 723. Additionally the NRL entry includes a log-linkage, non-repudiation token LGLNRT 722, generated according to the method described above in connection with FIG. 6. The LGLNRT is kept secret and provides the basis for associating a long series of NRL entries together.

The set of information included in the NRV and NRL in FIG. 7a forms the basic building blocks of the non-repudiation mechanism in this embodiment. No pointers are required in the NRL to support this basic linkage, as linkage is always to the previous NRL entry.

Enhancements to the basic non-repudiation mechanism will now be described with reference to FIGS. 7b-7e.

Figure 7B:
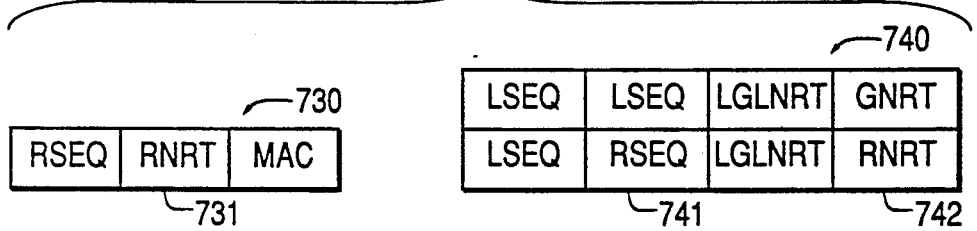

Referring to FIG. 7b, the NRL may additionally record entries for received messages. In the figure, the NRV 730 for a received message is shown, along with the receiver's NRL entry 740. In this case the logged sequence number in the OCV relates to the originator's NRL (not shown) and so is referred to as RSEQ (received sequence number). This number RSEQ is stored 741 on the receiver's NRL 740, in addition to the sequence number LSEQ of then entry on NRL 740. Also from the point of view of the recipient NRL 740, the GNRT token in the NRV was generated remotely by the originator, and so is referred to as RNRT (received non-repudiation token) 731. The RNRT is stored 742 on NRL 740.

It should be stressed that the only difference between the GNRT and RNRT is one of perspective; at a particular NRL the generated non-repudiation token is referred to as the GNRT if it was generated at that NRL in connection with a transmitted message, and is referred to as RNRT if it was received at that NRL in association with a received message. Accordingly the data field 723 in FIG. 7a now selectively records the GNRT or RNRT depending on whether the entry corresponds to a transmitted or a received message respectively.

Figure 7C:
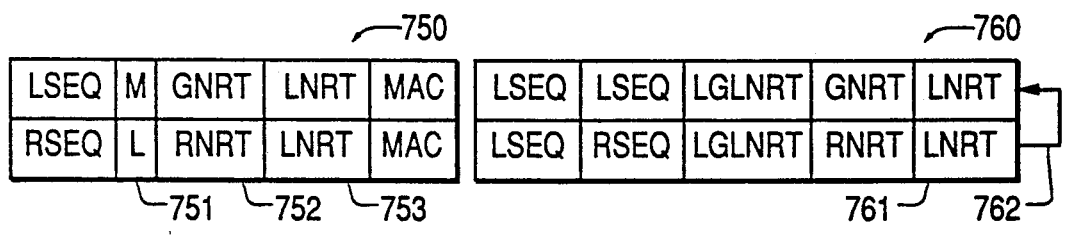

Now that sent and received OCVs are recorded, the messages corresponding to a single transaction may be linked together as shown in FIG. 7c. In this figure, the two NRVs 750 and corresponding NRL entries 760 illustrate a possible mechanism for this transaction linkage.

The NRVs 750 have been enhanced to show a transaction control indicator 751, a component of the OCV. This indicator states whether the NRV relates to the first, a middle, or the last message of a transaction. Also, a further data field 753 has been added to the NRV to provide a linked non-repudiation token LNRT which is made equal to the GNRT or RNRT from the previous message in the transaction. The data field 752 is used for the GNRT/RNRT relating to the current message. The NRL entries 760 are correspondingly enhanced to provide a data field 761 in which the LNRT from each message, sent or received, is recorded. A backwards pointer 762 is also provided, indicating the sequence number, in that NRL, of the entry corresponding to the previous message in the transaction. The GNRT/RNRT 763 of this previous message must equate to the LNRT 761 of the current message; this may be checked for on receipt of a particular message.

Figure 7D:
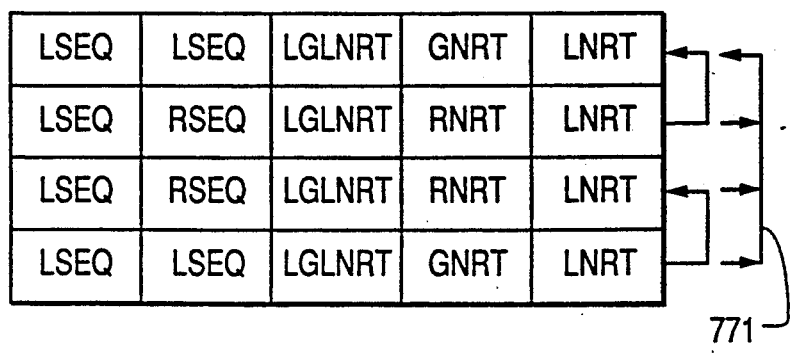
Figure 7E:
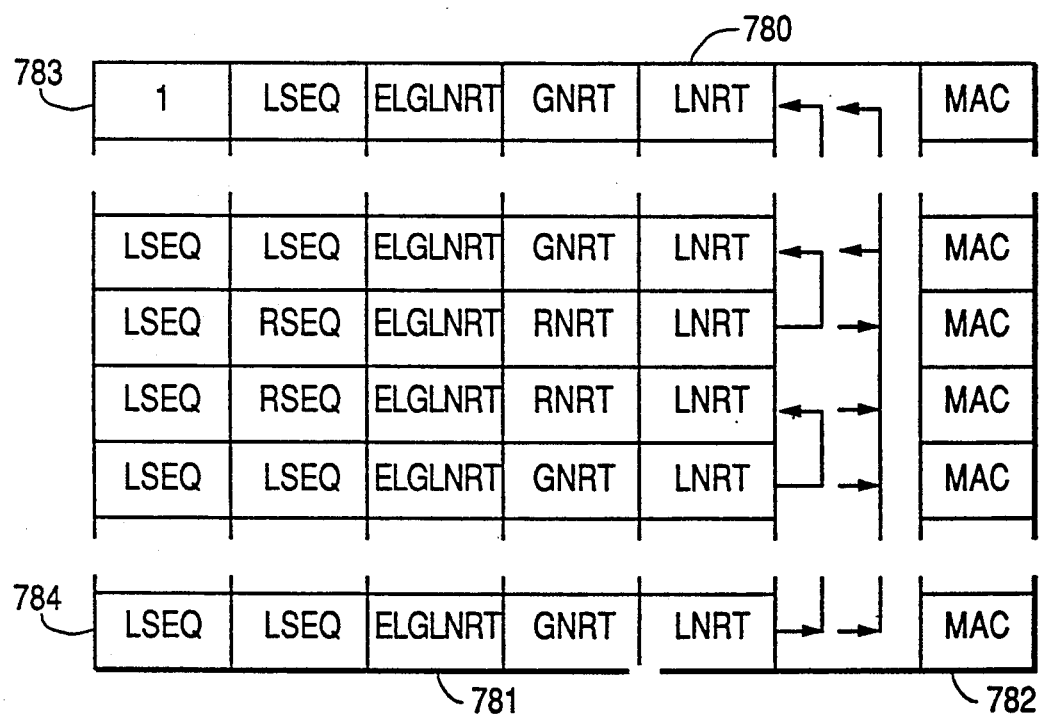

Since the NRL contains entries for both received and generated NRVs, a third enhancement is to bind those NRL entries corresponding to locally generated NRVs together. A method for achieving this is shown in FIG. 7d. In this figure several NRL entries 770 are shown; however, for the purposes of this explanation it is not necessary to show their corresponding NRVs. The NRL entries 770 illustrate a further pointer linking NRL entries 773, 774 and 775 back to the last generated entry 772.

Two final enhancements are illustrated in the NRL 780 shown in FIG. 7e. Again, the corresponding NRVs are not shown, since they are not required for this explanation. The additional features shown in FIG. 7e are intended to enhance the integrity of the NRL itself.

The first of the additional features in the figure is to secure the NRL data. One method is to use physical security (effectively providing a physically locked barrier to prevent unauthorized access to the NRL entries. Alternatively, cryptographic methods can be used. In FIG. 7e the secret LGLNRT field has been enciphered on the NRL to give an enciphered form ELGLNRT 781. Also, a MAC 782 has been generated for each NRL entry to prevent undetected modification or corruption. The keys used to apply these techniques should be secret to the non-repudiation token generating mechanism which creates the NRL entries.

The second feature shown is to introduce a judicial authority to settle disputes when an attempt is made to repudiate a message. Messages are exchanged with an independent judicial authority trusted by the communicating parties to provide the first entry 783 on the NRL and also to provide a subsequent NRL entry 784 following a dispute. In practice, such messages would be exchanged with the judicial authority at regular intervals during operation of the system. When a dispute occurs the linkages between NRL entries may then be traced back and forward to trusted entries, which can be verified by the judicial authority. This also allows disputes to be settled when there is no preceding or subsequent business entry on the NRL.

FIG. 8 is a table which shows a sequence of eight entries on a non-repudiation log (NRL) 800, which correspond to messages 880 from two interleaved transactions. The message NRVs and corresponding NRL entries are referred to as 861, 862, ... 868.

The NRL 800 may be considered as a further enhancement on those described in connection with FIG. 7a-7e. It contains the following data items for each entry, some of which are omitted from the diagram for clarity. Many of these items have been described above, but are listed again here by way of a summary:

The Log Control Vector (LCV) 810

The LCV is analogous to the OCV of the NRV, and similarly contains a number of subfields:

a) The Log Sequence Number (LSEQ) 811 identifies this entry on the NRL.

b) The Creation Method (not shown) describes the calculation and linkage convention used to generate the LGLNRT and GNRT values. It is recorded so that during resolution of a dispute these values may be regenerated for verification purposes using the same convention as used during their original creation.

c) The Origin Control Vector (OCV) is stored as an exact copy of the OCV sent or received in the NRV corresponding to this NRL entry.

The Log-Linked Non-Repudiation Token (LGLNRT) 820

This is the secret (and potentially enciphered) value that is used to bind this NRL entry to previous and subsequent NRL entries.

The Non-Repudiation Token (NRT) 830

The NRT contains the information which may be externally audited and tested to demonstrate whether the claimed NRV generator 310 was instrumental in generating the NRV. It may be a compound data structure containing the following sub-features:

a) The Generated Non-Repudiation Token (GNRT) 831 is the published value generated by the NRV generator 310 associated with the originator's data processor 300. In the present embodiment the GNRT comprises eight bytes of binary data.

b) The Linked Non-Repudiation Token (LNRT) 832 is potentially a free format token of variable length, the purpose of which is to provide an externally auditable association of this NRV with one or more other NRVs previously exchanged between the same two data processors 300 and 400. In the preferred embodiment it is a single data item comprising eight bytes of binary data, and corresponds to the GNRT from the NRV associated with the previous message sent or received in the same transaction. In practice this linkage can be of considerable value, but convention may require further or fewer linkages to be established.

Convention Linkage Pointers 840

For each of the linkages required by the convention used to generate the GNRT and LGLNRT, with the exception of the linkage to the previous NRL entry, a backwards pointer will be needed to identify the NRL entry to be linked. Two sub-features are shown (see also FIG. 7e):

a) The Transaction Linkage Pointer 841 points to the NRL entry corresponding to the previous message in the transaction.

b) The Generated Entry Linkage Pointer 842 points to the NRL entry corresponding to the previous message for which an NRV was generated by this non-repudiation token generator.

Other backwards pointers may be used as required by the generation convention in use.

The Message Authenticator

This is a MAC which may be used to ensure the security and integrity of the NRL. This is described above in connection with FIG. 7e).

FIG. 8 also illustrates some of the component items of the NRV 880 belonging to each message. These are shown to illustrate their correspondence to the NRL entries. The complete NRV is described above in connection with FIG. 4; the illustrated components are:

The Origin Sequence Number 881

Three sources of messages are shown, each of which provides its own origin sequence number. These are:

a) The local NRT generator whose origin sequence numbers are designated 1, 2, . . .

b) A first correspondent whose origin sequence numbers are designated a, b, . . .

c) A second correspondent having origin sequence numbers designated A, B, . . .

It should be noted that, for received messages, there are gaps in the Origin Sequence as perceived by the receiving NRL. These gaps correspond to messages sent by the correspondent to other nodes on the data network.

The Non-Repudiation Token (NRT) 882

As for the logged NRT, this is a compound structure.

The Transaction Control (TRNCTL) 883

This indicates whether the message supports to be the first, a middle, or the last message in a transaction.

Referring now to FIG. 8, two separate interleaved transactions are shown.

Transaction With the First Correspondent

This transaction comprises the following four messages, which can be identified by backward chaining from the transaction linkage pointers 841:

first message 862 received from the first correspondent;
middle message 864 received;
middle message 867 sent; and
last message 868 received.

Transaction With the Second Correspondent

Again, this transaction comprises four messages, which can be identified by backward chaining from the transaction linkage pointers 841:

first message 861 sent to the second correspondent;
middle message 863 sent;
middle message 865 received; and
last message 866 sent.

The messages originated at this NRL 800, namely messages 861, 863, 866, and 867, give rise to a generated GNRT. The generated entry linkage pointer 842 for each entry points to the LSEQ value for the most recent of these locally originated messages.

The NRT values of the NRL entries 830 and of the message NRVs 882 are identical for each particular entry, but the LGLNRT value 820 does not appear in the NRV for that message; instead, it is maintained secret by the NRL as described above. The terms 'GNRT' and 'RNRT' refer to generated NRTs 830 which are either locally generated or received respectively.

It is not necessary here to explain the value assigned to each data field for each entry in FIG. 8; the significance of these values will be apparent from the above description. However, the values corresponding to message 864 (a message received from the first correspondent) will be explained by way of an example.

Two components of the LCV 810 for message 864 are shown: the LSEQ and OSQ. LSEQ for this message has the value "864;" this is simply an index to the entry's position on the NRL 800. The OSQ value, "f," refers to the position of that message's entry on the first correspondent's NRL. The LGLNRT 820 is locally generated and kept secret, as described above.

The generated NRT for this message was in fact generated remotely by the first correspondent; as a received token (RNRT) it is designated "R4," and is used as the LNRT for the next message 867 in this transaction. Similarly, the LNRT value, "R2," is the generated NRT value from the previous message 862 in this transaction.

Two linkage pointers are shown; the generated linkage pointer has the value "863," pointing to the previous message sent (to any correspondent) having a locally generated GNRT, and the transaction control pointer has the value "862," pointing to the previous message in this transaction. For the first message in a transaction the linkage pointers may have to be assigned arbitrary values (000 on the diagram).

Referring to the NRV entries 880 shown in FIG. 8, the OSQ for message 864 has the value "f," the same as the OSQ in the NRL. Similarly the GNRT and LNRT fields contain the same values as the corresponding fields in the NRL. Finally, the transaction control field 883 has the value "m," showing that message 864 supports to be neither the first nor the last message in the transaction.

Figure 9:
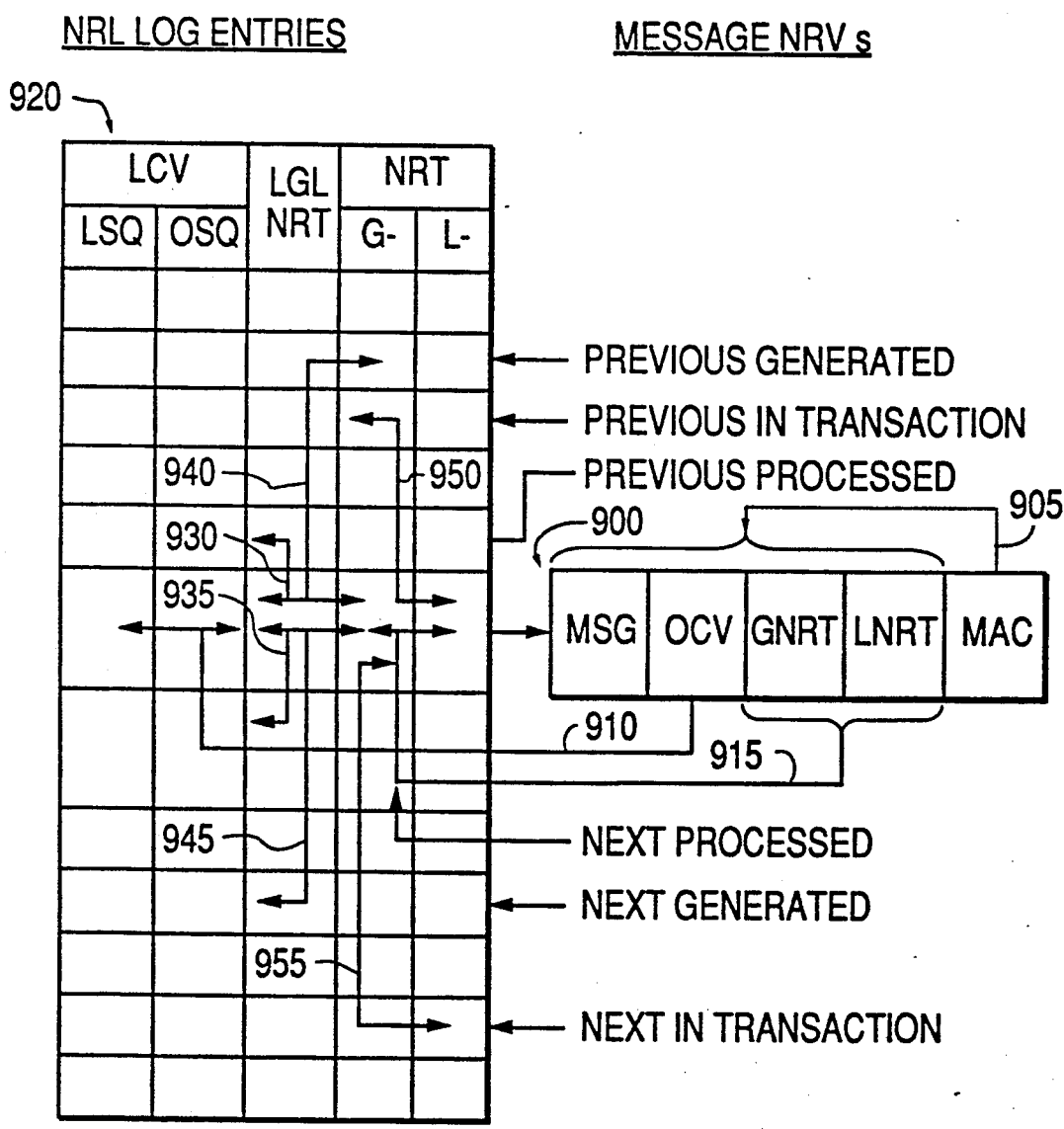
FIG. 9 is a table which summarizes the links and dependencies between a current message, its NRV, and the current and previous NRL entries, and the previous and subsequent NRVs generated at this NRL.

FIG. 9 summarizes the various linkages that are established between a message 900, its NRV and the corresponding NRL entry, between entries within the NRL 920, and between messages within a single transaction.

The message is bound to its NRV by the message authentication code (MAC) 905, and is identified with the entry in the sender's NRL 920 by the Origin Sequence Number 910 which appears in the NRV of the message and one or both of the sequence numbers in the NRL.

Within the NRL 920 the entries themselves may be linked irrespective of whether the messages correspond to the same transaction, by means of two linkage mechanisms described in detail above. The first is to link each NRL entry to the preceding and subsequent entries (shown schematically as linkages 930 and 935 respectively). The second linkage associates each NRL entry with the previous and subsequent entries for which a GNRT was locally generated as opposed to received. These are shown schematically as linkages 940 and 945 respectively, and are established cryptographically during the generation of the LGLNRT and, in the case of a sent message, the GNRT which is recorded both in the NRL and in the NRV of the sent message.

The non-repudiation token of the message comprises two components: the GNRT which is newly generated for this message, and the LNRT which is taken 950 from the NRL entry corresponding to the previous message in the transaction. This combined NRT is recorded 915 in both the NRV and the NRL. The GNRT for first or middle messages in a transaction will be reflected 955 in the next message in that transaction as its LNRT.

It will therefore be seen that the messages to which a particular message is linked are manifold and may be independent (that is, connected with a transaction involving an unrelated third party). As a result, to settle a dispute the evidence of many correspondents may be brought to bear in establishing the authenticity of an individual disputed item.

Figure 10:
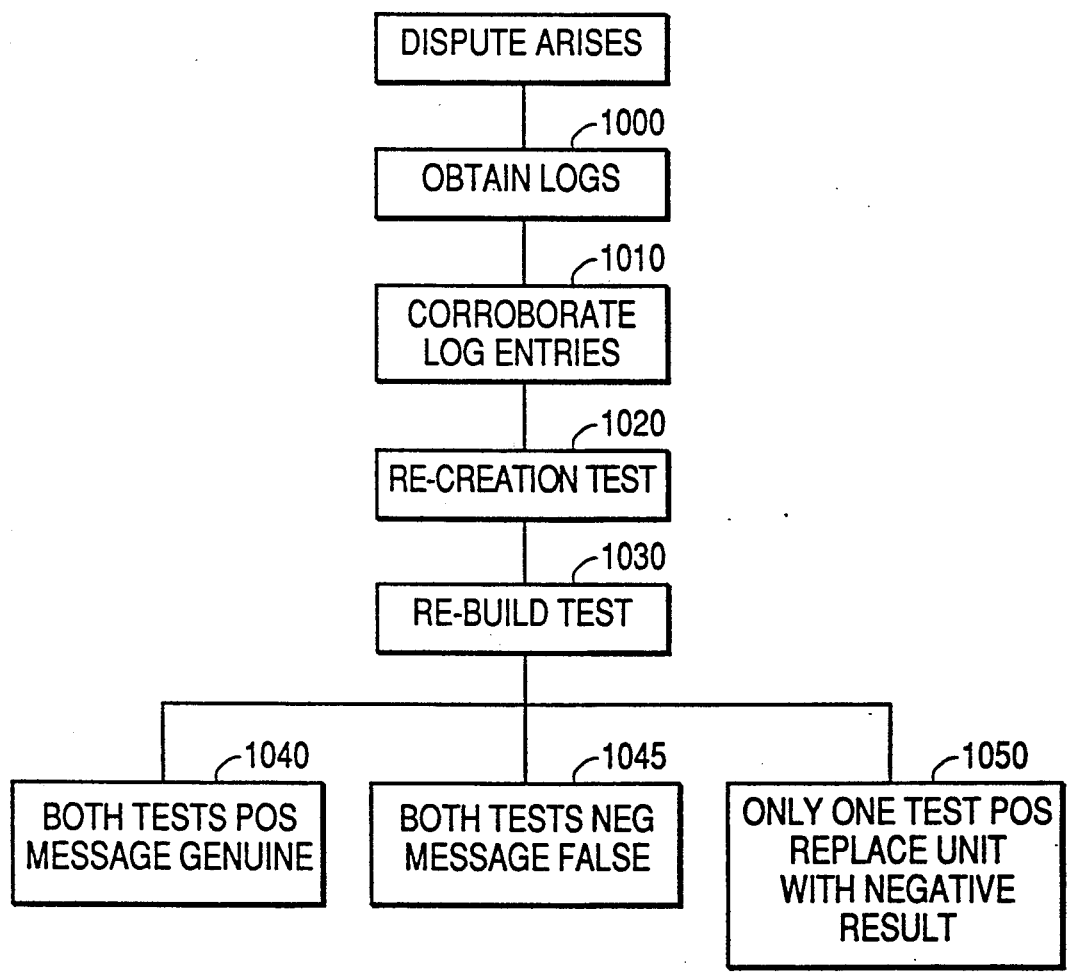
FIG. 10 is a flow chart illustrating the procedure for resolving a repudiation dispute over a particular message.

It now remains to describe the procedure for resolving a dispute between two parties as to whether or not the claimed sender of a disputed message was in fact the real sender. FIG. 10 shows a flow chart of the dispute resolution procedure. The first step 1000 is to obtain the relevant entries from the purported sender's NRL, covering the period before and after the message was sent in terms of both time and NRL entry sequence numbers. The disputed message will identify the NRL used and the NRL sequence number corresponding to the message. The claimed sender must produce a copy of this NRL upon the request of an arbiter. Refusal to do so would constitute a breach of trust, and so render the future credibility of the sender suspect. The NRL of the receiver, relating to the disputed transaction, must also be produced.

If there are no subsequent entries on the sender's NRL, an entry is forced by a dialogue with an independent third party (preferably a judicial authority). This may also have been done earlier to establish a first entry on the NRL.

In step 1010 the NRLs obtained above are corroborated. The NRLs are inspected for proper sequence and completeness. Each entry in each of the NRLs will represent a part of a dialogue. The entries corresponding to received messages will identify the correspondent's NRL and NRL sequence numbers. Copies of these corresponding NRLs should also be obtained. The entries in each correspondent's should correlate with those in the disputants' NRLs.

In particular, the following items should be corroborated in this way:

a) Item in each disputant's NRLs immediately prior to the disputed item;

b) The item in each disputant's NRL immediately following the disputed item;

c) The items in each disputant's NRL generated before and after the disputed item; and d) The item in each disputant's NRL before and after the disputed transaction in transaction sequence.

The integrity of the surrounding items, referred to above, should also be ascertained. From the business transaction records of these surrounding items, the relationship between the NRL entries and the transaction data should be verified using the MAC or DSG of the messages which contained NRVs. The transaction linkage should also be verified by tracing through the GNRT/LNRT chains, both in the messages and in the NRLs.

If one of these earlier items is also disputed then the two separate disputes will need to be settled in order of the NRL sequences. All earlier disputes must be resolved before the present dispute may be resolved.

The earliest entries will rely for their resolution on the first few entries in the NRL. These should have been placed there as part of a dialogue with a registration authority which registers the existence of the sender's hardware unit and itself holds a NRL to verify those first few entries.

In step 1020 a re-creation test is performed. The sender's hardware unit is challenged to create an NRV on the disputed message as if the state of the NRL were as it was at the moment of creation of the original, disputed, NRV. It should be noted that although the time, NRL sequence, and regeneration flag (and consequently the MAC) of the re-created NRV will be different, the NRT, LNRT and XNLT will determine whether or not the re-created NRV corresponds to the disputed NRV.

If the sender has an alternative data message which he claims was sent instead of the disputed message, then the NRV for this alternative message at that position in the NRL is re-created.

A rebuild test is then performed at step 1030. Given the newly created NRV, the sender must show that the next-generated (and not disputed) NRT and XNLT would also have been generated from the message data of the next-sent message.

If both tests 1020 and 1030 are positive then the disputed message is found to be genuine 1040. Similarly, if the disputed message is false then both test will prove negative 1045.

If a message is found for which one test succeeds and the other fails 1050 then the disputant for whom the test failed is bound to produce a message which can be historically corroborated and for which the test would succeed at his NRL. Failing this that disputant's data processing and security system is brought into disrepute and must be replaced, and the disputed message is deemed to be genuine. The assertion is that the cryptographic linkage is such that it is impractical to find such a message in any reasonable period of time.

To summarize, the dispute resolution procedure described in connection with FIG. 10 and the overall system as described above associate the activities of a particular sender with undisputed messages exchanged with a number of parties outside the dispute, and with previous and subsequent undisputed messages exchanged with the same correspondent. It is this ability to bring this independent evidence to bear in a dispute that places the disputed sender, who wishes to repudiate the disputed message, in the position of needing to demonstrate his own good behavior, rather than simply denying the message.

Although the invention has been described with reference to a preferred embodiment it will be clear to the skilled man that many different embodiments are possible without departing from the scope of the invention as claimed. The system described above may be implemented in several different ways, such as the use of generic data processing components under software control, the use of customized or specially designed integrated circuits, or the use of hardwired discrete logic components. The invention may be embodied, for example, as part of a larger data processing apparatus, as a peripheral to a data processor, or as a stand-alone encryption device.

What is claimed is:

1. A first data processor (10), connected to a network of other data processors (20, 30), comprising:
   means (300) for sending a message to a second data processor forming part of the network; and
   means (310) for cryptographically combining information derived from said message (600), information (612, 613, 614, 615) derived from one or more previous messages transferred between said first data processor and one of said other data processors forming part of the network, and secret information (611) held by the said first data processor, to produce a non-repudiation vector including an authentication token (540), said token cryptographically combined with said message.

2. A data processor as claimed in claim 1, further comprising means (300) for sending said token with said message to said second data processor.

3. A data processor as claimed in claim 2, in which some or all of the information derived from the one or more previous messages is derived from the token associated with that message or messages.

4. A data processor as claimed in claim 3, further comprising:
   means (140) for generating an authentication token (580) from said message and its associated token, thereby cryptographically associating said message and said associated token; and
   means for sending said authentically token to a receiver of the message.

5. A data processor as claimed in claim 4, in which said authentication token comprises control information (510), information derived from the current message, information derived from the previous message in the current transaction, and information derived from the last message sent by said first data processor.

6. A data processor as claimed in claim 5, further comprising a store (340) for storing secret information derived from the token or the associated message or both.

7. A data processor as claimed in claim 6, in which, non-secret information derived from the message or its associated token or both is stored in the store, and in which the data processor further comprises means for enciphering some or all of the information to be stored.

8. A data processor as claimed in claim 7, in which each entry in the store is linked to an adjacent entry in the store; and information is stored in the store in chronological order.

9. A data processor as claimed in claim 8, in which each entry in the store corresponding to a message forming part of a transaction comprising a plurality of messages is linked to the previous message in that transaction.

10. A data processor as claimed in claim 9, in which each entry in the store is linked to the entry corresponding to the last message sent by the data processor.

11. A data processor as claimed in claim 7, further comprising means (400), when connected to the network, for receiving a message sent by a data processor forming part of the network.

12. A data network (10, 20, 30, 40, 50, 60) comprising a plurality of data processors (10, 20, 30) as claimed in claim 7, and means (40, 50, 60) connecting the data processors for the transfer of messages therebetween.

13. A method for effecting non-repudiation of a data message in a computer network, including a plurality of data processors comprising the steps of:
   (a) initiating (110) a data meassage (550) in a first data processor (300) for transmission to second data processor (400) in the computer network;
   (b) generating (310) a non-repudiation vector (540), including an authentication token (530) derived from one or more previous messages transferred between said first data processor and one of said other data processors forming part of the network, and secret information (611) held by said first data processor;

(c) cryptographically combining said vector (540) to the data message (550) to form a compound message; and (c) enciphering (140) said compound message for transmission to said second data processor (400).

14. The method of claim 13 further including the steps of:

(a) maintaining a non-repudiation log (340); previous message information under the control of a key (320); and a message authentication code under the control of a key (330) for generation of the non-repudiation vector (540).

15. The method of claim 13 including the following steps in the data processor (400):

(a) deciphering (210) the compound message using a key (330);

(b) verifying the authentication token (530) in a non-repudiation vector verifier (430);

(c) stripping the non-repudiation vector (540) from the compound message;

(d) generating and storing an entry in a non-repudiation log (440) from the message (550), the non-repudiation vector (540) and one or more previous entries from said log (440) using a key (410); and (e) storing (250) said second data message (550) in the data processor 400.

16. The method of claim 13 further including the step of:

(a) generating a generated non-repudiation token (680) and a linked non-repudiation token (670) as a part of the non-repudiation token (520).

17. The method of claim 16 further including the steps of:

(a) generating a message authentication code (MAC 620) and (MAC 1 650) to form a cryptographic link between a data message (550) and the non-repudiation vector (540); and (b) generating a message authentication code (660) to form a cryptographic link between the message (550); a previous transaction message (614, 615); a previous generated message (612, 613); a previous message (611) stored in the log (340).

18. The method of claim 16 further including the steps of:

(a) concatenating message authorization codes (652 and 662) to form said generated non-repudiation token (680), and (b) concatenating message authorization codes (661 and 651) to form said linked non-repudiation token (670).

* * * * *